Sept. 21, 1965  C. W. SUNDBERG  3,207,527
MOBILE UNIT
Filed April 13, 1962  2 Sheets-Sheet 1
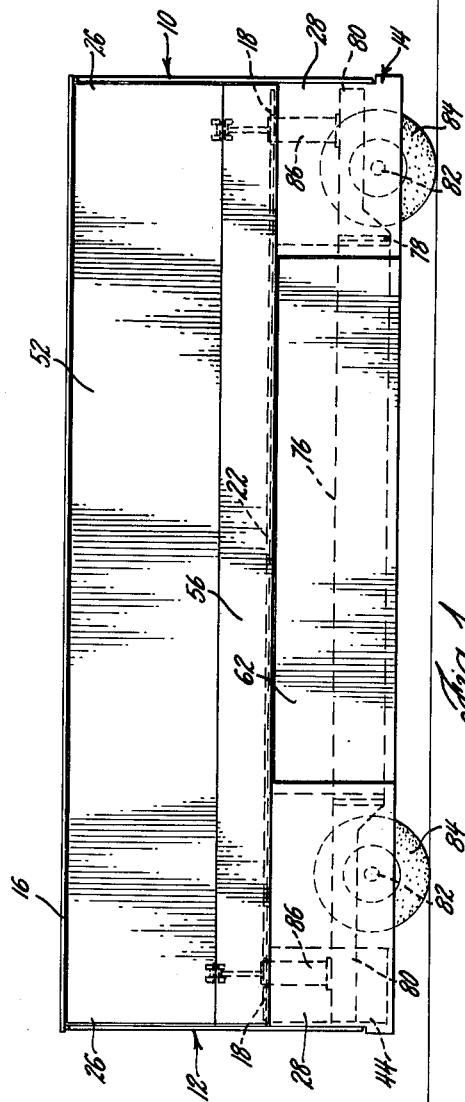
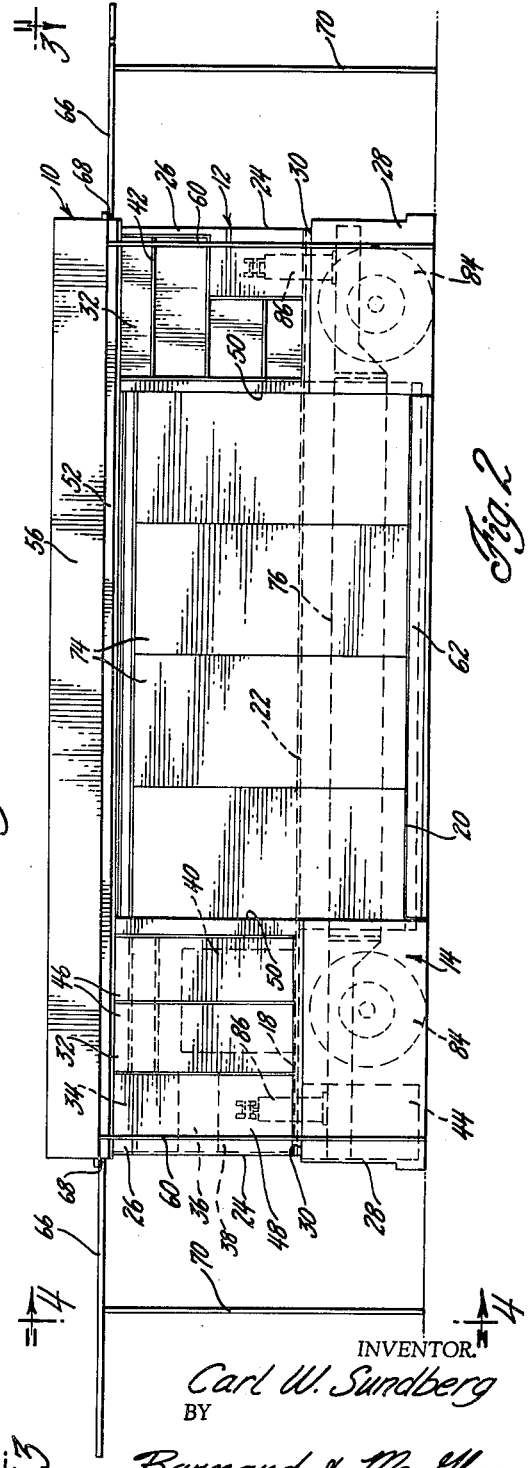
INVENTOR.
Carl W. Sundberg
BY
Barnard & McGlynn
ATTORNEYS

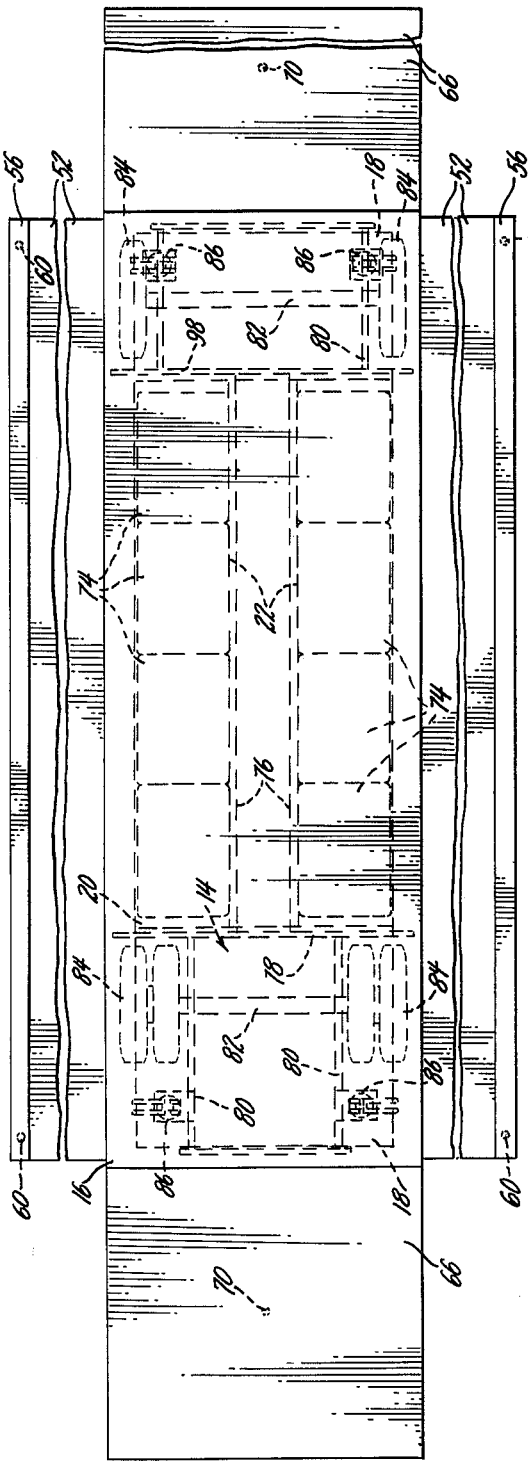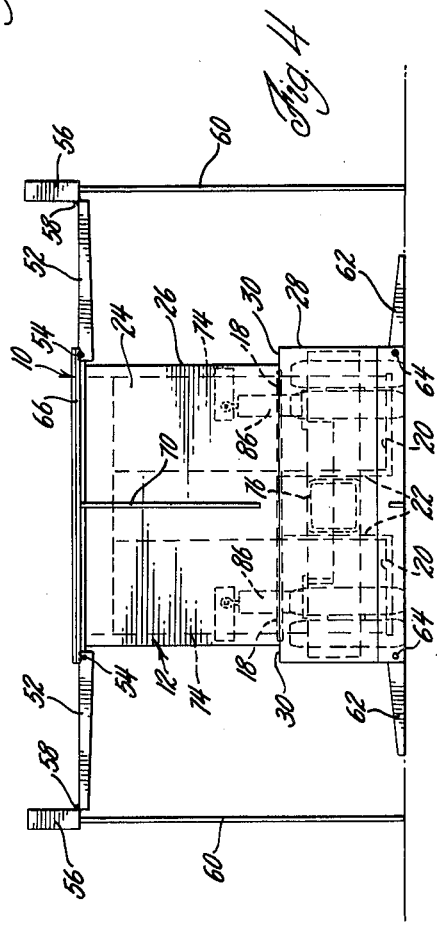

3,207,527
MOBILE UNIT
Carl W. Sundberg, Bloomfield Hills, Mich., assignor to American Metal Products Company, Detroit, Mich., a corporation of Michigan
Filed Apr. 13, 1962, Ser. No. 187,365
13 Claims. (Cl. 280—43.23)

This invention pertains to a readily transportable or mobile vehicular unit and, in particular, to an entirely self-contained mobile trailer-like unit adapted to be readily transported from one place of installation to another and to form a transportable housing for various activities such as automatic vending machines, washing and drying machines, health, inoculation and rescue centers, restrooms, repair shops, radio and TV broadcast stations, test laboratories and the like.

While the present invention may be employed for various and sundry purposes as alluded to above, and as will become more readily apparent hereinafter, it was conceived and developed with particular reference to providing a mobile vending unit easily and quickly transportable from one place of installation to another for the purpose of vending and dispensing food, drinks and related items as demand or other requirements dictate. Therefore, the comments and description which follow will have particular and specific reference to the features and advantages of such a mobile unit utilized in a vending application as aforementioned in order to illustrate the invention, it being understood, of course, that the mobile unit may be utilized for other purposes such as aforementioned, as well as others.

With specific reference to the use of the mobile unit to be hereinafter described as a housing for automatic vending machines, it will be recognized that there are various types of activities in which it is extremely desirable, if not actually absolutely necessary, to provide food, drink and the like at a particular location on a temporary basis. For example, there is a real demand for food, drinks and the like at sporting events such as football games, horse races and the like, at rest and picnic areas now provided along the more modern limited access super highways, in areas in which floods, fires and other disasters occur, and the like. To meet such needs, particularly with respect to sporting events, intinerant vendors are known to appear at such locations at the proper times for the purpose of selling their wares to spectators at such events. In some instances, mobile manned popcorn stands, hot dog stands and the like have also been utilized for this purpose, particularly in connection with sporting events.

However, and apart from the fact that manpower is required, such prior known mobile food dispensing units have been limited as to the locations in which they may be used simply because they are dependent upon outside sources for water, heat, light and other utilities. Furthermore, they are adapted for only one type of use and, in fact, are especially constructed for such one type of use, and further do not include means for protecting customers or other users of the unit from rain, snow and the other elements. The present invention is directed to a solution of these and other problems in the mobile vending art, as well as to an improvement in mobile units in general which may be readily adapted for different uses and quickly and easily moved from one installation to another, and which are further characterized by a relatively compact transportable construction containing its own utilities which may be readily installed in a given location and then readily returned to a transportable condition for removal to a different location.

It is, therefore, a principal object and feature of this invention to provide an improved mobile unit of the type aforementioned which is of compact construction to facilitate transportation thereof from one site to another, and which may be readily set up or erected from said compact condition to an open construction at any given site where its use is demanded, and readily returned to its compact roadable condition when it is desired to transport the unit to another location.

It is yet another object and feature of this invention to provide a mobile trailer-like unit of general purpose utility, particularly adapted for housing a plurality of automatic vending machines, including closure members which normally enclose the interior of the unit or cover and protect the vending machines during transportation of the unit, but which may be readily moved to an opened position permitting access to the interior of the mobile unit or to the vending machines upon installation of the unit at a particular site.

It is yet another object and feature of this invention to provide a mobile unit of the type aforementioned, particularly adapted to house a plurality of automatic vending machines, characterized by one or more substantially enclosed but accessible utility compartments for sources of heat, light, refrigeration and the like and for storage purposes, a generally open section for access to the interior of the unit and in which the vending machines may be mounted, and closure means operable between a position closing the open section of the unit during transportation of the latter and openable to permit access to the interior thereof or to the vending machines mounted therein while at the same time providing a roof for the protection of users of the unit or the machines mounted therein.

It is a further object and feature of this invention to provide a mobile unit of the type aforementioned further comprising hinged end flaps movable to a roof-forming position upon installation of the mobile unit in any given site to provide further protection for users of the unit or vending machines mounted therein.

It is yet another object and feature of this invention to provide a mobile unit of the type aforedescribed comprising a substantially enclosed body member including side wall means defining an access opening from each side of the body member to the interior thereof, first and second closure members hinged to each side of the body member and having a first cooperating position closing the aforementioned access openings to the body member and a second open position in which one of said closure members forms a roof-like structure over the access opening and the other closure member forms an access ramp or the like for ambulatory access to the interior of the body member through the aforementioned access opening.

It is yet another object and feature of this invention to provide a mobile unit including a body member as aforementioned further including a pair of utility compartments located on either side of the access openings to the body member and each including a utility opening through the side wall means of the body member, and in which one of the aforementioned closure members also forms a closure for such utility openings when closed over the access opening.

It is yet another object and feature of this invention to provide a mobile unit including a body member as aforementioned further characterized by a chassis including supporting wheel means, and means vertically adjustably mounting the body member on the chassis member whereby the body member may be lowered into ground-engaging position at any given installation site for the unit and the closure members opened to provide access to the interior of the body member through the aforementioned access opening, one of the closure members forming a ramp-like ambulatory access passage to the interior of the body member at the access opening and the other closure member forming a roof for protecting anyone approaching the access opening along the ramp-like member.

These and other objects, features and advantages of the invention will appear more fully hereinafter as the description of the invention proceeds, and in which reference is made to the drawings in which:

FIGURE 1 is a side elevation of a mobile unit constructed in accordance with a preferred embodiment of the invention, and showing the unit in the condition it assumes for transportation thereof;

FIGURE 2 is a view corresponding generally to FIGURE 1, but showing the unit installed in a given location;

FIGURE 3 is a view taken on line 3—3 of FIGURE 2; and

FIGURE 4 is a view taken on line 4—4 of FIGURE 2.

Referring now to the drawings, the numeral 10 generally indicates a mobile unit comprising a body member indicated generally at 12 and a chassis member indicated generally at 14. The body member 12 comprises a roof 16 and spaced oppositely therefrom a floor means comprising the end floor sections 18 and a lower central floor section 20 therebetween and suitably operatively rigidly secured thereto. The central floor section includes an upstanding centrally located longitudinally extending transom 22 of generally inverted U-shaped configuration for a purpose to appear fully hereinafter. As will be readily apparent from the drawings, the roof 16 and floor means comprising the floor sections 18 and 20 extend substantially the full length of the body member, and are suitably rigidly connected at their opposite ends to end walls 24. Oppositely spaced side wall members each including upper and lower portions 26 and 28 suitably rigidly interconnect the roof 16 and the respective end floor sections 18 and end walls 24 at each end of the body member, and extend between the roof and the lower edges of the end walls 24 which are contained in substantially the same plane as the lower central floor section 20. Furthermore, it will be noted particularly from FIGURE 4 that the lower portion 28 of each of the side wall members extends laterally outwardly from the upper portion 26 thereof so as to form a shelf or ledge 30 on each side and at opposite ends of the body member.

The respective end floor sections 18 cooperate with the upper portions 26 of the side wall members and an upper portion of the end wall members 24 to form a substantially enclosed utility compartment 32 at each end of the body member 12. FIGURE 2 illustrates such compartments as enclosing various elements such as, for example, a motor-generator unit 34, a heating unit 36, a sink unit 38, refrigerator or freezing unit 40 and laterally projectable shelving units 42. A trash container 44 is indicated in dotted lines in FIGURES 1 and 2 as being disposed in the lower portions 28 of the side wall members at one end of the body member so as to have its open upper end communicating with the ledge or shelf 30. Each of the utility compartments includes utility openings communicating therewith through each of the side wall members aforementioned. Thus, the utility compartment 32 at one end of the body member or to the left in FIGURES 1 and 2, is of two part construction, one part including a utility opening on each side thereof adapted to be closed by a pair of hinged swingable doors indicated at 46 swingable toward and away from each other for access to the refrigerating or freezing unit 40 as well as the shelving 42, while a single door closure 48 is similarly hinged to close a utility opening on each side of the body member to the motor-generator, heating and sink units. The shelving units 42 at the other end of the body member communicate with utility openings on each side of the body member which, in this instance, are not provided with cooperating doors as described above. Finally, and referring particularly to FIGURE 2, the aforedescribed side wall members at each end of the body member 12 define access openings 50 to the interior thereof between the roof 16 and central floor section 20.

A combined roof and closure member is indicated at 52 and has one edge thereof suitably hingedly connected adjacent the roof 16 as indicated at 54 on each side of body member 12 so as to be movable between a closure position as illustrated in FIGURE 1 and a raised position as illustrated in FIGURES 2 through 4 forming a roof-like canopy on each side of the body member of the unit. The other end of the combined roof and closure member includes an elongate coextensive portion 56 hingedly connected to the main portion of the closure as indicated at 58 in FIGURE 4 so as to be capable of articulation into the position illustrated in FIGURES 2 and 4 to form an advertising sign upon installing the body member at a given site. Means such as rods 60 extending from the ground may be utilized to prop the roof and closure members in their roof forming positions. It will be noted that the combined roof and closure member including the sign-forming portion thereof are substantially coextensive with the length of the body member 12 and particularly the roof 16 thereof so that, in the closure position as illustrated in FIGURE 1, they extend substantially the full length of the body member and form a closure over the doors 46 and 48 at one end of the body member and directly over the utility openings and shelving 42 therein in the compartment at the other end thereof. It will also be noted that the central portion of the combined roof and closure member forms a portion of a closure for the central access opening 50 in the body member 12 between the utility compartments 32, and that in its closure position the sign-forming portion 56 thereof nest along the ledge or shelf 30 joining the upper and lower portions 26 and 28 of each of the side wall members aforedescribed.

A combined closure and ramp member 62 is suitably hingedly connected to each side of the body member 12 as indicated at 64 in FIGURE 4 adjacent the lower central floor section 20 thereof. Each closure and ramp member is adapted to be swung to the closure position illustrated in FIGURE 1 in which the other end thereof mates with the central portion of the sign-forming portion 56 of the roof and closure member 52 to form a closure for the lower portion of the access opening 50 to the body member. Each ramp and closure member may also be swung downwardly to the position illustrated particularly in FIGURE 4 to provide an ambulatory access up to the central floor section 20 on either side of the mobile unit.

A pair of end flaps 66 have their upper ends suitably hingedly connected as indicated at 68 in FIGURE 2 at respective ends of the body member 12 adjacent roof 16 so as to have a transporting position normally substantially abutting the end walls 24, but being movable outwardly to the positions illustrated particularly in FIGURES 2 and 3 to form additional roof structures to protect users or customers of the mobile unit. Again, means such as rods 70 are adapted to be interposed between the end flaps 66 and the ground to hold them in their roof-forming positions upon installation of the unit in any given location, and may be readily removed to drop the aforementioned flaps into the closed position as illustrated in FIGURE 1. Perhaps needless to mention, suitable means may be provided for latching the end flaps 66 in the positions illustrated in FIGURE 1, and likewise latching the closure members 52 and 62 in the position illustrated in FIGURE 1 during transportation of the mobile unit.

A plurality of vending machines of the automatic variety are illustrated schematically at 74 as being aligned in substantially abutting side-by-side engagement with each other and respective sides of the transom member 22, and resting on the lower central floor section 20. Furthermore, the vending machines extend substantially entirely between the utility compartments 32 to fill the access opening 50 on each side of the body member. However, it will be readily apparent that other arrangements of the vending machines on either side of the transom member 22 may be made.

The chassis member 14 includes a central longitudinally extending rectangular torque tube or box 76 rigidly connected at opposite ends thereof to chassis frame members each including a transversely extending frame member 78 and the pair of longitudinally extending spaced rails 80 to which an axle 82 supporting the road wheels 84 may be suitably mounted in any desired manner. It will be noted particularly from FIGURE 4, that the torque tube or box 76 is embraced by the side members of the transom 22. A plurality of fluid pressure operated hydraulic jacks 86 of the type comprising relatively reciprocable piston and cylinder elements, herein shown to be four in number, each extend between and have their respective elements suitably secured to body member 12 and chassis member 14 substantially at each corner of the mobile unit. It will be understood that a suitable hydraulic system including selector valve means is provided to control operation of the jacks 86 and the raising and lowering of the body member 12 relative to the chassis member 14 between the positions illustrated in FIGURES 1 and 2.

As will now be apparent, the mobile unit 10 is adapted to be towed by a suitable prime mover to a given location for installation, and the jacks 86 operated to drop the body member 12 relative to the chassis member 14 so as to engage with the ground or other surface on which the unit is mounted. Thereafter, the combined roof and closure members 52 and the combined ramp and closure members 62 may be moved to the positions illustrated particularly in FIGURE 4 to provide access to the vending machines 74 mounted on the central floor section 20 of the body member. At the same time, the end flaps and roof-forming members 66 may also be elevated to the positions illustrated particularly in FIGURE 2. Thus, customers for the vending machines find ready access thereto from either side of the mobile unit and are protected from the elements while using such machines by the closure members 52, and may move from the vending machines under the end roofs 66 while consuming their purchases. Refuse may be deposited within the trash containers 44. Should it be desired to service the vending machines or to remove them, this may be readily accomplished due to the substantially ground level location thereof with the unit lowered. Furthermore, the unit may be installed in practically any otherwise feasible location since it contains its own utilities. When it is desired to transport the mobile unit to another location, the rods 60 and 70 are quickly and easily removed to lower the various flaps and closure members aforedescribed, the jacks 86 operated to elevate the body member relative to the chassis member, and the unit then towed to its new location. In this regard, it will be noted that, with the closure members 52 and 62 in the positions of FIGURE 1 for towing of the unit, the closure member 52 including the roof or sign-forming portion 56 thereof nests along the ledges or shelves 30 and that such closure member conceals and protects the upper side wall portions 26 and 28 forming a part of the utility compartments 32 and, particularly in this regard, prevents the shelving units 42 stored in the utility compartment at the right in FIGURE 2 from being thrown out during movement of the unit. Furthermore, the central portion of the combined roof and closure member 52 cooperates with the combined ramp and closure member 62 to form a complete closure for the access openings 50 on each side of the body member 12, and completely encloses and conceals the vending units 74 and interior of the body member from view. Hence, the entire body member may be easily and quickly closed up and elevated relative to the chassis member and its wheels for towing the unit to a subsequent location.

While but one form of the invention has been shown and described, other forms will now be apparent to those skilled in the art. Therefore, it is to be understood that the embodiment shown in the drawings is merely for illustrative purposes, and is not intended to limit the scope of the invention which is defined by the claims which follow.

I claim:

1. A mobile vehicular unit comprising a body member including oppositely spaced roof and floor means, side wall means interconnecting said roof and floor means on one side of said body member to form an access opening to the interior thereof between said roof and floor means, a combined roof and closure member having one end thereof hingedly connected to said body member adjacent said roof means, said combined roof and closure member being movable between a lowered closure position relative to said access opening and a raised roof-forming position extending outwardly from said body member, and a combined access and closure member having one end thereof hingedly connected to said body member adjacent said floor means, said combined access and closure member being movable between a raised closure position relative to said access opening and a lowered ground-engaging position extending outwardly from said body member for ambulatory access to said access opening, the other end of said roof and closure member and said access and closure member being in mating engagement in said closure positions thereof.

2. A mobile vehicular unit comprising a body member including oppositely spaced roof and floor means, means including a side wall member interconnecting said roof and floor means on one side of said body member to form a substantially enclosed utility compartment therewithin and an access opening between said roof and floor means adjacent said compartment to the interior of said body member, said side wall member including a utility opening to the interior of said compartment, a combined roof and closure member having one end thereof hingedly connected to said body member adjacent said roof means and extending substantially the length of said body member, said combined roof and closure member being movable between a lowered closure position closing said utility opening and a portion of said access opening and a raised roof-forming position extending outwardly from said body member, and a combined access and closure member having one end thereof hingedly connected to said body member adjacent said floor means and extending substantially the length of said access opening, said combined access and closure member being movable between a raised closure position closing another portion of said access opening and a lowered ground-engaging position extending outwardly from said body member for ambulatory access to said access opening, the other ends of said roof and closure member and said access and closure member being in mating engagement in said closure positions thereof.

3. A mobile vehicular unit comprising a body member including oppositely spaced roof and floor means extending substantially the length thereof, said floor means including oppositely spaced end portions connected to an intermediate lower central portion therebetween, means including oppositely spaced side wall members at opposite ends of said body member and interconnected with said roof means and said respective end portions of said floor means to form substantially enclosed utility compartments, said side wall members on at least one side of said body member forming an access opening to the interior thereof along the length of said central portion of said floor means between said compartments, at least one of said last-named side wall members including a utility opening to the interior of its associated compartment, a combined roof and closure member having one end thereof hingedly connected to said body member adjacent said roof means and extending substantially the length of said body member, said combined roof and closure member being movable between a lowered closure position closing said utility opening and an upper portion of said access opening and a raised roof-forming position extending outwardly from said body member, and a combined access and closure member having one end thereof hingedly connected to said body member adjacent said central portion of said floor means and extending substantially the length of said access opening, said combined access and closure member being movable between a raised closure position closing the lowered portion of said access opening and a lowered ground-engaging position extending outwardly from said body member for ambulatory access to said access opening, the other ends of said roof and closure member and said access and closure member being in mating engagement in said closure positions thereof.

4. The invention as defined in claim 3 in which said lower central portion of said floor means includes a longitudinally extending upstanding transom, and further comprising a chassis member including torque tube means extending between and connecting opposite ends thereof, wheel means respectively mounted on said opposite ends of said chassis member for transporting said unit, and means vertically adjustably mounting said body member on said chassis member with said respective utility compartments substantially over said wheel means and said transom opposite and adapted to receive said torque tube means upon lowering of said body member relative to said chassis member.

5. A mobile vehicular unit comprising a body member including oppositely spaced end wall means and oppositely spaced roof and floor means connected therebetween, said floor means including oppositely spaced end portions respectively connected to said end wall means and a lower central portion therebetween, oppositely spaced side wall members respectively connected between each of said end portions of said floor means, the end wall means associated therewith and said roof means to form a utility compartment at each end of said body member and an access opening therebetween on at least one side of said body member to the interior thereof, at least one of said side wall members on said one side of said body member including a utility opening to the interior of its associated compartment, and first and second closure members each having one end hingedly connected to said body member adjacent, respectively, said roof means and said central portion of said floor means between said compartments on said one side of said body member, said first closure member being substantially coextensive with said roof means and said second closure member being substantially coextensive with said central portion of said floor means, said first and second closure members being relatively movable between a closure position in which the other ends thereof matingly engage to close said access opening and said first closure member closes over said utility opening, and an open position in which said first closure member extends laterally outwardly from said roof means to form a roof member and said second closure member extends outwardly from said central portion of said floor means and engages the ground to form an ambulatory access member to said access opening.

6. A mobile vehicular unit comprising a body member including oppositely spaced end wall means and oppositely spaced roof and floor means connected therebetween, said floor means including oppositely spaced end portions respectively connected to said end wall means and a lower central portion therebetween, oppositely spaced side wall members respectively connected between each of said end portions of said floor means, the end wall means associated therewith and said roof means to form a utility compartment at each end of said body member and an access opening therebetween on each side of said body member to the interior thereof, said side wall members including utility openings to the interiors of said respective compartments, and first and second closure members on each side of said body member and each having one end hingedly connected to said body member adjacent, respectively, said roof means and said central portion of said floor means between said compartments, said first closure member being substantially coextensive with said roof means and said second closure member being substantially coextensive with said central portion of said floor means, said first and second closure members being relatively movable between a closure position in which the other ends thereof matingly engage to close said respective access openings and said first closure member closes over said respective utility openings, and an open position in which said first closure members extend laterally outwardly from said roof means to form roof members and said second closure members extend outwardly from said central portion of said floor means and engages the ground to form an ambulatory access member to said access opening.

7. A mobile vehicular unit comprising a body member including oppositely spaced roof and floor means extending substantially the length thereof, said floor means including oppositely spaced end portions connected to an intermediate lower central portion therebetween having a longitudinally extending transom upstanding therefrom, means including oppositely spaced side wall means at opposite ends of said body member and interconnected with said roof means and said respective end portions of said floor means to form substantially enclosed utility compartments, said side wall means forming access openings on each side of said body member to the interior thereof along the length of said central portion of said floor means between said compartments, at least some of said side wall means including a utility opening to the interior of said respective compartments, a combined roof and closure member for each side of said body member and each being hingedly connected to said body member adjacent said roof means and extending substantially the length of said body member, each of said combined roof and closure members being movable between a lowered closure position closing said utility openings and an upper portion of said access opening on each side of said body member and a raised roof position extending outwardly from said body member, a combined access and closure member for each side of said body member and each being hingedly connected to said body member adjacent said central portion of said floor means and extending substantially the length of said access opening, each of said combined access and closure members being movable between a raised closure position closing the lower portion of said access opening and a lowered position extending outwardly from said body member for ambulatory access to said access opening; a chassis member including torque tube means extending between and connecting opposite ends thereof, wheel means respectively mounted on said opposite ends of said chassis member for transporting said unit, and means vertically adjustably mounting said body member on said chassis member with said respective utility compartments substantially over said wheel means and said transom opposite and adapted to receive said torque tube means upon lowering of said body member relative to said chassis member.

8. A mobile vehicular unit comprising a body member including oppositely spaced end wall means and oppositely spaced roof and floor means connected therebetween, said floor means including oppositely spaced end portions respectively connected to said end wall means and a lower central portion therebetween having a longitudinally extending upstanding transom, oppositely spaced side wall members respectively connected between each of said end portions of said floor means, the end wall means associated therewith and said roof means to form a utility compartment at each end of said body member and an access opening therebetween on each side of said body member to the interior thereof, at least one of said side wall members on each side of said body member including a utility opening to the interior of its associated compartment, first and second closure members on each side of said body member and each having one end hingedly connected to said body member adjacent, respectively, said roof means and said central portion of said floor means between said compartments, said first closure member being substantially coextensive with said roof means and said second closure member being substantially coextensive with said central portion of said floor means, said first and second members being relatively movable between a closure position in which the other ends thereof matingly engage to close said respective access openings and said first closure member closes over said respective utility openings, and an open position in which said first closure member extends laterally outwardly from said roof means to form a roof member and said second closure member extends outwardly from said central portion of said floor means to form an ambulatory access member to said access opening; a chassis member including torque tube means extending between and connecting opposite ends thereof, wheel means respectively mounted on said opposite ends of said chassis member for transporting said unit, and means vertically adjustably mounting said body member on said chassis member with said respective utility compartments substantially over said wheel means and said transom opposite and adapted to receive said torque tube means upon lowering of said body member relative to said chassis member.

9. A mobile vehicular unit comprising a body member including oppositely spaced roof and floor means, said floor means having a longitudinally extending upstanding transom, side wall means interconnecting said roof and floor means to form utility compartments at opposite ends of said transom and an access opening between said compartments on one side of said body member to the interior of the latter, first and second closure members each having one end hingedly connected to said body member adjacent, respectively, said roof means and said floor means, said first and second closure members being relatively movable between a closure position in which the other ends thereof matingly engage to close said access opening and said first closure member closes over said utility compartments and an open position in which said first closure member extends laterally outwardly from said roof means to form a roof member and said second closure member extends outwardly from said central portion of said floor means to form an ambulatory access member to the interior of said body member; a chassis member including torque tube means extending between and connecting opposite ends thereof, wheel means respectively mounted on said opposite ends of said chassis member for transporting said unit, and means vertically adjustably mounting said body member on said chassis member with said respective utility compartments substantially over said wheel means and said transom opposite and adapted to receive said torque tube means upon lowering of said body member relative to said chassis member, said last-named means including fluid pressure operated jacks including relatively reciprocable piston and cylinder elements extending between said chassis and body members.

10. A mobile vehicular unit comprising a body member including floor means having a longitudinally extending upstanding transom, a chassis member including longitudinally extending torque tube means, wheel means mounted on said chassis member for transporting said unit, and means vertically adjustably mounting said body member on said chassis member with said transom opposite and adapted to receive said torque tube means upon lowering of said body member relative to said chassis member.

11. A mobile vehicular unit comprising a body member including oppositely spaced roof and floor means, said floor means having a longitudinally extending upstanding transom, side wall means interconnecting said roof and floor means on one side of said body member to form an access opening to the interior thereof between said roof and floor means, closure means for said access opening including a combined access and closure member substantially coextensive with said access opening, said closure member being movable between a closure position relative to said access opening and an open position extending outwardly from said floor means to form an ambulatory access member to said access opening, a chassis member including longitudinally extending torque tube means, wheel means mounted on said chassis member for transporting said unit, and means vertically adjustably mounting said body member on said chassis member with said transom opposite and adapted to receive said torque tube means upon lowering of said body member relative to said chassis member.

12. A mobile vehicular unit comprising a body member including oppositely spaced end wall means and oppositely spaced roof and floor means connected therebetween, said floor means including oppositely spaced end portions respectively connected to said end wall means and a lower central portion therebetween having a longitudinally extending upstanding transom, oppositely spaced side wall members respectively connected between each of said end portions of said floor means, the end wall means associated therewith and said roof means to form a utility compartment at each end of said body member and an access opening therebetween on each side of said body member to the interior thereof, first and second closure members on each side of said body member and each having one end hingedly connected to said body member adjacent, respectively, said roof means and said central portion of said floor means between said compartments, said first and second closure members being relatively movable between a closure position in which the other ends thereof matingly engage to close said respective access openings, and an open position in which said first closure member extends laterally outwardly from said roof means to form a roof member and said second closure member extends laterally outwardly from said central portion of said floor means to form an ambulatory access member to said access opening, a chassis member including torque tube means extending between and connecting opposite ends thereof, wheel means respectively mounted on said opposite ends of said chassis member for transporting said unit, and means vertically adjustably mounting said body member on said chassis member with said respective utility compartments substantially over said wheel means and said transom opposite and adapted to receive said torque tube means upon lowering of said body member relative to said chassis member.

13. A mobile vehicular unit comprising a body member including oppositely spaced roof and floor means, said floor means including a longitudinally extending upstanding transom, side wall means interconnecting said roof and floor means on one side of said body member to form an access opening to the interior thereof between said roof and floor means, closure means for said access opening comprising a combined access and closure member hingedly connected to said body member adjacent said floor means, said combined access and closure member being movable between a raised closure position relative to said access opening and a lowered position extending outwardly from said body member for ambulatory access to said access opening, a chassis member including longitudinally extending torque tube means, wheel means mounted on said chassis member for transporting said unit, and means vertically adjustably mounting said body member on said chassis member with said transom opposite and adapted to receive said torque tube means upon lowering of said body member relative to said chassis member.

References Cited by the Examiner

UNITED STATES PATENTS

| | | | |
|---|---|---|---|
| 245,937 | 8/81 | Bybee | 296—23 |
| 540,866 | 6/95 | Mally | 296—23 |
| 1,937,062 | 11/33 | Kellett | 254—2 |
| 1,953,053 | 3/34 | Linn | 280—106 |
| 2,551,207 | 5/51 | Ensor | 296—23 |
| 2,835,502 | 5/58 | Willets | 280—43.23 X |
| 2,860,384 | 11/58 | Wait et al. | 20—2 |
| 2,890,498 | 6/59 | Bigelow | 20—2 |
| 2,904,850 | 9/59 | Couse et al. | 296—26 X |
| 2,940,769 | 6/60 | Taylor | 280—43.23 |
| 3,001,796 | 9/61 | Martin | 280—43.23 X |
| 3,012,795 | 12/61 | Doerfler | 280—106.5 X |

A. HARRY LEVY, *Primary Examiner.*

BENJAMIN HERSH, *Examiner.*

UNITED STATES PATENT OFFICE
CERTIFICATE OF CORRECTION

Patent No. 3,207,527  September 21, 1965

Carl W. Sundberg

It is hereby certified that error appears in the above numbered patent requiring correction and that the said Letters Patent should read as corrected below.

Column 1, line 45, for "intinerant" read -- itinerant --; column 3, line 28, after "appear" insert -- more --; line 66, for "freezing" read -- freezer --; column 4, line 33, for "nest" read -- nests --; column 5, line 1, for "opening" read -- openings --; column 9, line 13, after "second" insert -- closure --.

Signed and sealed this 12th day of April 1966.

(SEAL)
Attest:

ERNEST W. SWIDER
Attesting Officer

EDWARD J. BRENNER
Commissioner of Patents